Nov. 29, 1955 A. J. MEYERHOFF ET AL 2,725,516
AMPLIFIER
Filed Feb. 5, 1952
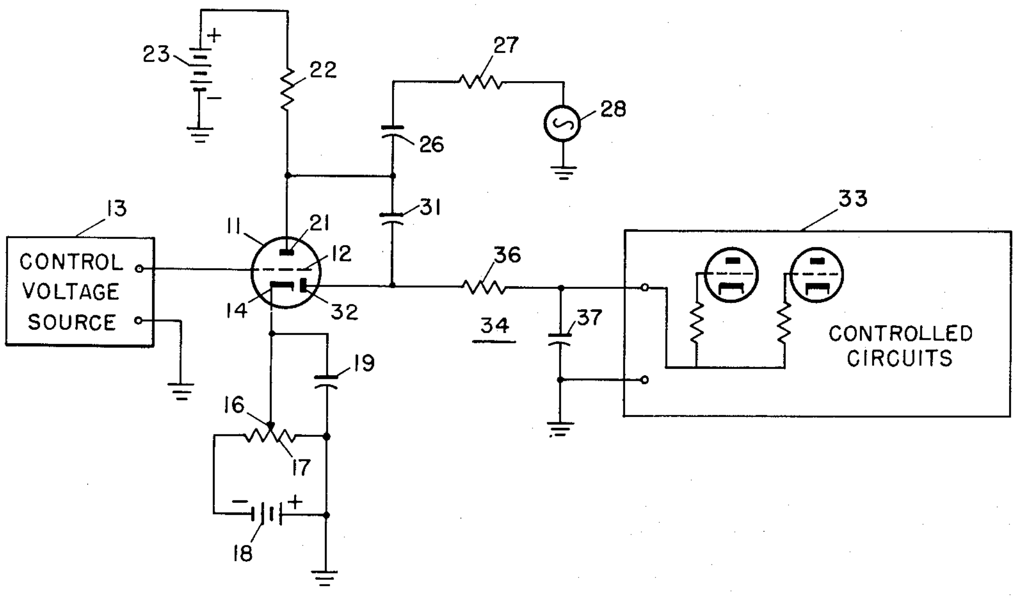
INVENTOR.
ALBERT J. MEYERHOFF
FRANK W. HEINIS
BY
Darby & Darby
ATTORNEYS United States Patent Office
2,725,516
Patented Nov. 29, 1955

2,725,516

AMPLIFIER

Albert J. Meyerhoff, Hackensack, and Frank W. Helnis, Paterson, N. J., assignors to Allen B. Du Mont Laboratories, Inc., Clifton, N. J., a corporation of Delaware Application February 5, 1952, Serial No. 270,096
4 Claims. (Cl. 321—23)

This invention relates to electrical amplifiers suitable for amplifying low-frequency signals and D.-C. signals.

An object of the invention is to provide a low-frequency amplifier suitable for amplifying automatic gain-control signals in radio and television circuits.

Another object is to provide a single-stage amplifier, the amplified output signal of which is in phase with the input signal.

The single figure of the drawing is a schematic diagram of a circuit which embodies the invention.

Referring to the drawing, the control grid 12 of an electronic tube 11 is connected to an output terminal of a source 13 of control voltage. A cathode 14 is connected to an arm 16 of a potentiometer 17 which is connected across a bias voltage source 18. A condenser 19 is connected between the cathode 14 and ground. An anode 21 in the tube 11 is connected through a resistance 22 to a terminal of a source 23 of D. C. voltage, and also through a condenser 26 and a resistor 27 to a source 28 of A. C. voltage. A condenser 31 is connected between the anode 21 and an auxiliary anode 32 which, in tube 11, forms a diode rectifier in cooperation with the cathode 14. The auxiliary anode 32 is connected to a terminal of controlled circuits 33 through a filter circuit 34 comprising a series resistance 36 and a shunt capacitance 37.

The circuit operates as follows: Current from the D. C. supply 23 flows through the resistance 22 and the tube 11. The amount of this current is controlled by the value of the control voltage supplied by the source 13. When the voltage from the source 13 is made more positive, for example, the current through the tube 11 from the source 23 increases, thereby effectively decreasing the resistance of the tube 11.

The A. C. signal from the source 28 supplies current through the resistance 27, the capacitance 26, and the tube 11. The A. C. voltage which appears across the tube 11, passes through the condenser 31 to the auxiliary anode rectifier 32, where it is rectified in a manner known as negative-peak-rectification and becomes a pulsating D. C. voltage having negative polarity. This pulsating voltage is smoothed out by the filter 34 to form a D. C. voltage which is applied to the controlled circuits 33. The reduced A. C. voltage appearing across the tube 11, because of the decreased resistance thereof, results in a decrease in the negative voltage provided by the peak rectification anode 32, i. e., the resulting rectified voltage becomes less negative and thus the output D. C. voltage becomes relatively more positive. Thus, the polarity of the change in output voltage is the same as the polarity of the change of the input control voltage.

When the control voltage is changed in a negative direction, the output D. C. voltage will become relatively more negative, in a manner similar to that described above, except that polarities and magnitudes in the process are reversed.

The invention is particularly adaptable to communications circuits, such as television and radio, which require an amplified automatic gain-control bias voltage. In such a circuit, the control voltage source 13 is commonly obtained from the second detector stage of the circuit, and the control circuits 33 are commonly the control grids of R. F. and I. F. amplifier stages. The D. C. voltage source 23 may be the usual D. C. source in such a circuit, which normally has a value of about 300 volts; the A. C. source 28 may be the high-voltage winding of a power supply transformer, which commonly has a value of 300 or 600 volts, or a sawtooth deflection generator in a TV receiver. The resistance 27 may be replaced with an inductance if desired, since an inductance offers impedance to an A. C. signal.

The condenser 26 prevents a direct coupling between the source 28 and the tube 11, and also provides a partial impedance, in this circuit, to the A. C. voltage. The condenser 31 functions to couple the A. C. voltage to the rectifier anode 32, and simultaneously to isolate the D. C. source 23 from the anode 32. The resistance 22 functions to reduce the current drain from the D. C. source 23. The potentiometer 17 functions to provide an adjustable cathode bias for the tube 11, thereby providing a gain control for the amplifier. The condenser 19 functions to bypass the A. C. current which flows through the tube 11. The tube 11 may comprise a triode, a pentode, or the like, or a transistor or equivalent device.

The D. C. output voltage supplied by the circuit of the invention is of the desired negative polarity to bias the control grids of electronic tubes. The feature of the invention whereby the changes of the output signal are in phase with the change in the input signal is desirable in such circuits since this feature causes the negatively biased tubes in the control circuits 33 to become relatively more conductive when a positive-polarity increase in control voltage is produced by the control voltage source 13. A feature of the invention is the arrangement whereby the common cathode 14 in the tube 11 is utilized both in the amplifier part of tube 11 and in the rectifier part thereof, thus resulting in economy.

While a preferred embodiment of the invention has been particularly described, modifications thereof may occur to those skilled in the art.

What is claimed is:

1. An amplifier comprising an electronic variable impedance tube having a control electrode and an output electrode, a source of control voltage connected to said control electrode to control the impedance of said tube, a source of D. C. voltage connected to said output electrode to energize said tube, a source of A. C. voltage connected through an impedance to said output electrode, a rectifier, and means electrically connecting said rectifier to said output electrode to rectify the A. C. voltage drop across said tube.

2. An amplifier comprising an electronic variable impedance tube having a cathode, an anode, a control electrode interspersed between said cathode and anode, and an auxiliary anode forming a rectifier in cooperation with said cathode; a source of control voltage connected to said control electrode to control the impedance of said tube; a source of D. C. voltage connected to said anode to energize said tube; a source of A. C. voltage connected to said anode through an impedance, a signal coupling means connected between said anode and said auxiliary anode; and controlled circuits connected to said auxiliary anode.

3. An amplifier comprising an electronic variable impedance tube having a cathode, an anode, a control electrode interposed between said cathode and anode, and an auxiliary anode forming a rectifier in cooperation with said cathode; a source of control voltage connected to said control electrode to control the impedence of said tube; a source of D. C. voltage connected through a resistance to said anode to energize said tube; a source of A. C. voltage connected through a resistance and a capacitance to said anode; a capacitance connected between said anode and said auxiliary anode; and controlled circuits connected through a filter to said auxiliary anode.

4. In a communications circuit having a source of gain-control voltage and electronic tubes having gain-control electrodes, an amplifier comprising an electronic variable impedance tube having a cathode, an anode, a control electrode interposed between said cathode and anode, and an auxiliary anode forming a rectifier in cooperation with said cathode; a connection between said control electrode and said source of gain-control voltage to control the impedance of said tube thereby, a source of D. C. voltage connected to said anode to energize said tube, a source of A. C. voltage connected through an impedance to said anode, a coupling circuit connected between said anode and said auxiliary anode, and a filter connected between said auxiliary anode and said gain-control electrodes.

References Cited in the file of this patent

UNITED STATES PATENTS

| | | |
|---|---|---|
| 2,194,552 | Hunt | Mar. 26, 1940 |
| 2,239,915 | Hunt | Apr. 29, 1941 |
| 2,395,770 | Vilkomerson | Feb. 26, 1946 |
| 2,422,087 | Everett | June 10, 1947 |
| 2,529,428 | Spielman | Nov. 7, 1950 |